Dec. 14, 1965    P. F. GIRARD    3,223,361
FLEXIBLE WING WITH INTEGRATED TAIL UNIT
Filed Oct. 5, 1964    2 Sheets-Sheet 1

INVENTOR.
PETER F. GIRARD
BY
Knox & Knox

Dec. 14, 1965 P. F. GIRARD 3,223,361
FLEXIBLE WING WITH INTEGRATED TAIL UNIT
Filed Oct. 5, 1964 2 Sheets-Sheet 2

INVENTOR.
PETER F. GIRARD
BY
Knox & Knox

United States Patent Office 3,223,361
Patented Dec. 14, 1965

3,223,361
FLEXIBLE WING WITH INTEGRATED TAIL UNIT
Peter F. Girard, La Mesa, Calif., assignor to The Ryan Aeronautical Co., San Diego, Calif.
Filed Oct. 5, 1964, Ser. No. 401,478
4 Claims. (Cl. 244—75)

The present invention relates to aircraft and more specifically to a flexible wing with an integrated tail unit.

The basic type of flexible wing has a negative pitching moment at zero lift condition, or at very low angles of attack. Normally this is overcome by suspending the payload so that the center of gravity is well below the wing, to give pendulum stability to the wing. This complicates the structure and limits the range of designs using a flexible wing.

The primary object of this invention, therefore, is to provide a flexible wing having a tail unit integral with the basic wing structure and including movable pitch control surfaces which are effective at all times and prevent occurrence of the negative pitching condition.

Another object of this invention is to provide a flexible wing wherein the tail unit is structurally integrated with the main supporting keel of the wing and requires no added structure or special reinforcement in the basic wing.

Another object of this invention is to provide a flexible wing having a tail unit incorporated into the rear of the flexible wing panels and being continuous with the flexible panels.

A further object of this invention is to provide a tail unit which is adaptable to a variety of flexible wing configurations with a wide range of performance characteristics, either powered or unpowered, manned or automatically controlled.

In the drawings.

Similar characters of reference indicate similar or identical elements and portions throughout the specification and throughout the views of the drawings.

*Basic flexible wing*

Figure 1:
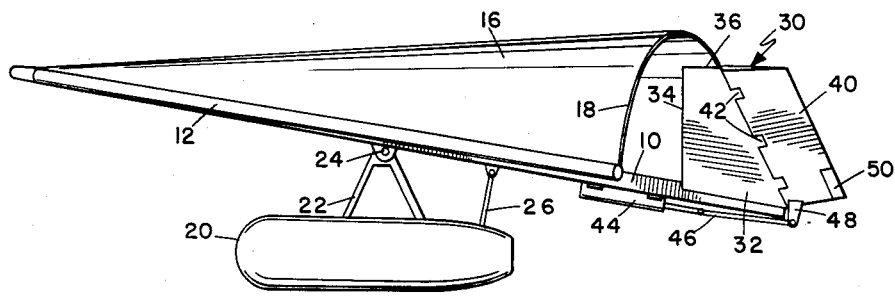
FIGURE 1 is a side elevation view of a flexible wing aircraft incorporating the tail unit.
Figure 2:
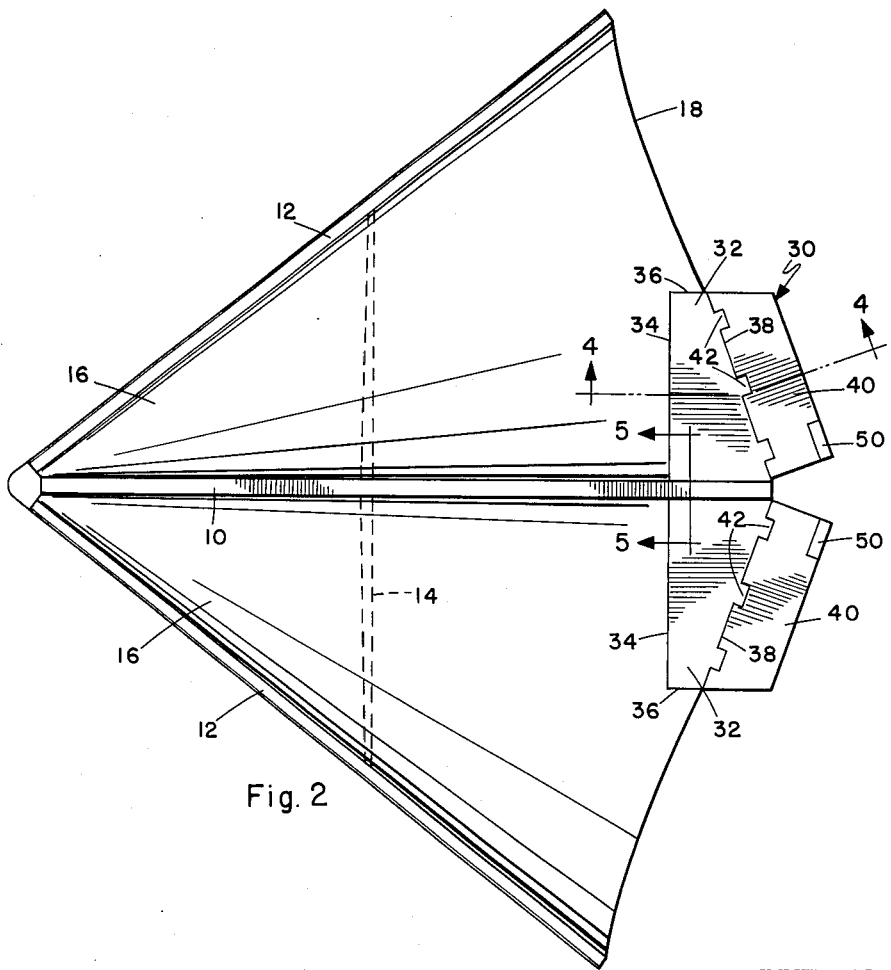
FIGURE 2 is a top plan view of the wing.
Figure 3:
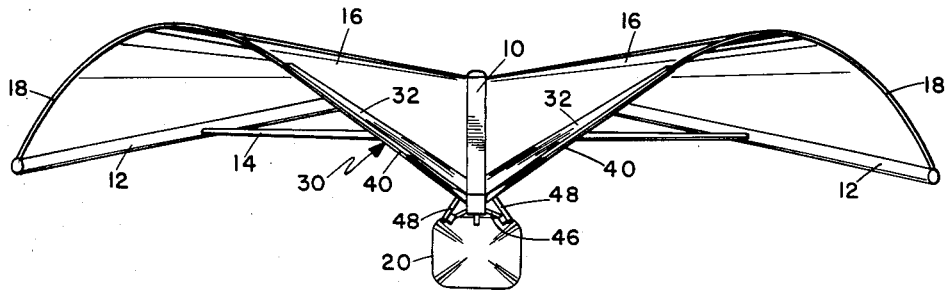
FIGURE 3 is a rear elevation view of the aircraft.
Figure 4:
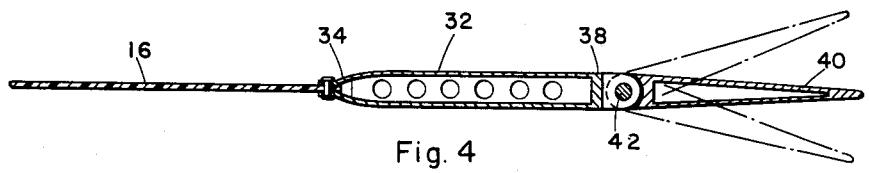
FIGURE 4 is an enlarged fragmentary sectional view taken on line 4—4 of FIGURE 2.

The basic wing structure comprises a rigid longitudinal keel 10 with a pair of leading edge members 12 extending angularly rearwardly on opposite sides from the forward end of the keel, the leading edge members being held at the required sweep back angle by a transverse spreader bar 14. Secured to and between the keel 10 and leading edge members 12 are flexible lifting panels 16, the trailing edges 18 of the panels being free. This general arrangement is well known and the specific structure and materials may vary considerably, depending on the particular type of aircraft.

A payload 20 is indicated as suspended from the keel 10 by a frame 22, with a pivotal connection 24 at the keel. Between the payload 20 and keel 10 is a strut 26, which may be adjustable to trim the wing by changing the angle of attack, this being accomplished by effectively shifting the center of gravity of the payload relative to the center of lift of the wing. The principle involved and suitable mechanism for accomplishing this, together with roll control means, are fully described in U.S. Patent No. 3,140,842 entitled Flexible Wing Aircraft. As illustrated the aircraft is unpowered, but various propulsion means can be used and the payload can take the form of a passenger or cargo cabin with provision for manual control, auto-pilot, or remote control means.

*Tail unit*

Figure 5:
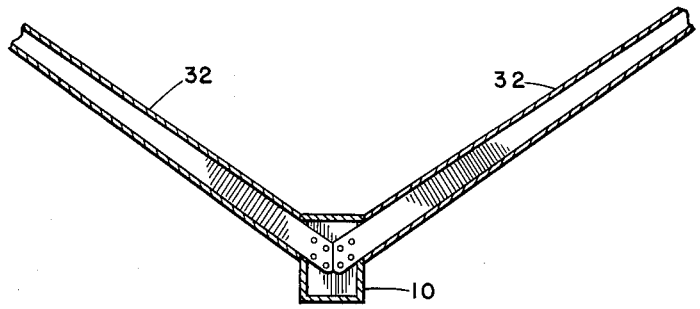
FIGURE 5 is an enlarged fragmentary sectional view taken on line 5—5 of FIGURE 2.

The tail unit, generally indicated at 30, comprises a pair of tail planes 32 secured to the rear end of keel 10 and extending on opposite sides thereof at large dihedral angle to form a V-tail. Tail planes 32 are rigidly secured to the keel 10 by any suitable means, such as illustrated in FIGURE 5. The lifting panels are cut away and secured to the forward edges 34 and outer ends 36 of tail planes 32, so that the tail planes are inset in and substantially continuous with the lifting panels. The dihedral angle of the tail planes 32 is such that the tail planes conform to the upwardly bowed configuration of the lifting panels 16 in flight and the natural contours of the wing are disturbed as little as possible. Attached to the rear edges 38 of tail planes 32 are elevators 40, pivotally mounted on hinges 42 to swing up and down and act as pitch control surfaces. Various means may be used to operate elevators 40, that shown including a push-pull jack or actuator 44 secured to keel 10 and having control rods 46 extending to horns 48 on the elevators. Other means, such as mechanical linkages or control cables could be used, depending on the services available in the aircraft.

The tail unit provides controlled stability at all speeds and, at low speeds or conditions where lift is reduced to a critical level, the powerful action of the elevators can be used to prevent nose down pitching. Pendulum stability is not necessary and it has been found in tests that the aircraft is stable even with the center of gravity substantially on the keel, as long as the center of gravity is slightly forward of the wing aerodynamic center.

In aircraft wherein the payload is attached directly to the keel, or incorporated into an enlarged keel, and it is not possible to vary the wing incidence, as by the strut 26, trim tabs 50 may be fitted to the elevators 40 to provide longitudinal trim. The control and function of such trim tabs are well known in conventional aircraft.

It is understood that minor variation from the form of the invention disclosed herein may be made without departure from the spirit and scope of the invention, and that the specification and drawings are to be considered as merely illustrate rather than limiting.

I claim:

1. In a flexible wing aircraft having a longitudinal keel and flexible wing panels secured to and extending on opposite sides of the keel, the improvement comprising:
   a tail unit having rigid tail plane portions secured to the rear end of said keel and to rear portions of said wing panels and extending on opposite sides thereof;
   and movable pitch control surfaces operably pivotally mounted on said tail plane portions.

2. In a flexible wing aircraft having a longitudinal keel and flexible wing panels secured to and extending on opposite sides of the keel, the improvement comprising:
   a tail unit having rigid tail plane portions secured to the rear end of said keel and extending on opposite sides thereof;
   said tail plane portions being inset into and forming substantially continuous portions of said flexible wing panels;
   and movable pitch control surfaces operably pivotally mounted on said tail plane portions.

3. In a flexible wing having a longitudinal keel, leading edge members extending angularly rearwardly from the forward end of said keel on opposite sides thereof, and wing panels secured to and between said keel and said leading edge members, said panels being flexible and assuming an upwardly bowed configuration under aerodynamic load, the improvement comprising:
   a tail unit having rigid tail plane portions secured to the rear end of said keel and extending upwardly and outwardly on opposite sides thereof;
   and movable pitch control surfaces operably pivotally mounted on said tail plane portions.

4. In a flexible wing having a longitudinal keel, leading edge members extending angularly rearwardly from the forward end of said keel on opposite sides thereof, and wing panels secured to and between said keel and said leading edge members, said panels being flexible and assuming an upwardly bowed configuration under aerodynamic load, the improvement comprising:
   a tail unit having rigid tail plane portions secured to the rear end of said keel and extending upwardly and outwardly on opposite sides thereof;
   said tail plane portions being inset into and joined to said flexible wing panels, and being angularly disposed relative to said keel to form substantially continuous portions of the bowed wing panels;
   and pitch control surfaces operably pivotally mounted on said tail plane portions.

References Cited by the Examiner
UNITED STATES PATENTS 2,097,990 11/1937 Sikorsky _____ 244—87
2,697,567 12/1954 Fiedler _____ 244—87 X

OTHER REFERENCES

Wetmore, W. C.: Dornier is Developing Paraglider Rocket in Aviation Week and Space Technology, Jan. 13, 1964. Pages 65, 67, 69, 70, 71 and 74.

MILTON BUCHLER, *Primary Examiner.*
ANDREW H. FARRELL, *Examiner.*